3,064,057
CONDENSATE OF ETHYLENE OXIDE AND
AN ALKYLATED BIS-PHENOL
Raymond Liebling, Springfield, N.J., and Robert Steckler, Russel Township, Geaugan County, Ohio, assignors to Nopco Chemical Company, Harrison, N.J., a corporation of New Jersey
No Drawing. Filed Aug. 7, 1958, Ser. No. 753,606
1 Claim. (Cl. 260—613)

The present invention relates to novel aromatic glycols and alkyd and polyester resins obtained therefrom, which are useful as coating compositions.

Those engaged in the art are constantly seeking new and improved resinous materials suitable for coatings. Among the objectives sought after are the preparation of resins which are tenacious, flexible, alkali and water resistant as well as soluble in relatively inexpensive organic solvents. The resin should be easily blended with other components and ancillary ingredients in order to permit formulation of various coating compositions adapted for particular uses. Furthermore, the resin should be prepared in as direct and economical manner as possible. The hydroxy and carboxylic components should condense or esterify easily under moderate reaction conditions.

We have unexpectedly accomplished the above as well as other objects in the following manner. We have discovered a novel class of dihydric alcohols or aromatic glycols which, when availed of in the preparation of resins to be described hereinafter, brings about superior resins having great utility in coating compositions. Our novel class of aromatic glycols may be described as a condensate of ethylene oxide and an alkylated bis-phenol, said condensate being represented by the following structure

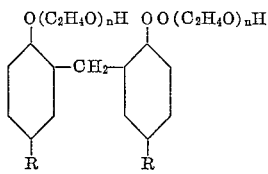

in which R is a straight or branched chain or carbocyclic alkyl substituent having from about 5 to 12 carbon atoms and $n$ is an average number lying between one and two.

The unique structure of our aromatic glycols imparts many valuable properties to alkyd resins containing same and also reduces undesirable side reactions during resin formation. By replacing the phenolic hydroxyl groups with primary alcoholic groups, a glycol is obtained which may be easily esterified. At the same time this material is not subject to undesirable dehydration reactions since the alcoholic groups derived from ethylene oxide are primary alcohol groups. Furthermore, coatings of alkyd resins prepared from our aromatic glycols have been found to exhibit extreme hydrophobic properties which we believe are imparted by the presence of alkyl substituents attached to the aromatic nuclei. These resins have been found to be extremely flexible no doubt due also to the presence of the alkyl substituents. They are also easily soluble in inexpensive organic solvents. Moreover, coatings prepared from these resins are highly resistant to alkalis.

We are aware of the preparation of other aromatic hydroxy compounds such as those described in U.S. Patent No. 2,454,542, Bock et al., issued November 23, 1948. However, the compounds described in this patent call for at least three aromatic hydroxy substituents whereas we have described two. Such polyfunctional materials of the prior art are different from our glycols. For instance, if they are reacted with dibasic acids in attempts to form polyesters, cross-linking and gelation will occur at low degree of esterification, thereby rendering the resulting product useless for our purposes.

These aromatic glycols may be prepared as follows. First, a bis-phenol is prepared by reacting from 1.67 to 2.00 mols of a para substituted alkyl phenol with one mol of formaldehyde or equivalent amounts of paraformaldehyde, trioxane, etc. Suitable para substituted phenols are p-amyl phenol, p-tertiary amyl phenol, p-hexyl phenol, p-octyl phenol, p-decyl phenol and p-dodecyl phenol. Condensation temperatures of from 65° to 105° C. are maintained for about 2 to 6 hours. The resulting product is essentially a bis-phenol of the formula

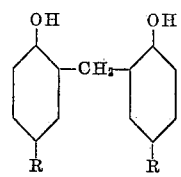

wherein the substituent, R, is as described previously. The bis-phenol is thereafter reacted with ethylene oxide in amounts to provide for an average of from about 1 to 2 mols, preferably 1.1 to 1.5 mols, of ethylene oxide per phenolic hydroxyl group. The ethylene oxide addition is carried out by reacting the bis-phenol with ethylene oxide at 150° to 200° C., optionally under pressure, e.g., 25 p.s.i., in the presence of about 0.1% alkali hydroxide or alkali metal carbonate as catalyst.

The above aromatic glycol is subsequently reacted with one or more saturated aliphatic dicarboxylic acids such as succinic acid, adipic acid, sebacic acid, etc. or aromatic dicarboxylic acids or anhydrides such as phthalic acid, phthalic anhydride, iso-phthalic acid, terephthalic acid, etc. or mixtures thereof. Cross-linking is accomplished by having present during reaction a polyfunctional alcohol having at least three hydroxyl groups such as glycerol, pentaerythritol, sorbitol, trimethylol propane, etc. or mixtures thereof.

A further glycol component, i.e., a non-aromatic glycol may be used in admixture with our novel aromatic glycol such as ethylene glycol, propylene glycol, diethylene glycol, etc. and mixtures thereof. The presence of these additional glycols reduces the cost of preparing our alkyd resins since it replaces part of the more expensive aromatic glycol. Also, we believe that they may possibly speed up the cooking time. These glycols have been found to contribute to a viscosity reduction of solutions of the resin in solvents when they are present.

We also find it desirable to incorporate fatty acids, or mixtures thereof in our resin compositions. They are added to the reaction mixture containing the aromatic glycol, the non-aromatic glycol, the polyfunctional alcohol having at least three hydroxyl groups and the dicarboxylic acid or anhydride. These acids are saturated or unsaturated fatty acids having from about 10 to 22 carbons in their chain such as soya fatty acids, linseed oil fatty acids, dehydrated castor fatty acids, coconut fatty acids, cottonseed fatty acids, tall oil fatty acids and fish oil. The presence of such acids contributes to the flexibility and durability of the coating. If desired, the glycerides of said fatty acids may be used instead, such as linseed oil, soybean oil, tung oil, dehydrated castor oil, oiticica oil and perilla oil. We, however, prefer to use the free fatty acids.

For reaction, we prefer to employ approximately stoichiometric amounts of the acid substituent and of the hydroxyl substituent. The acid substituent comprises the dicarboxylic acid or anhydride plus the fatty acid or glyceride, if present. Thus, the fatty acid or glyceride may be present in amounts of from 0% to about 50% by weight of the total reactants. The hydroxyl substituent comprises a glycol component i.e., the aromatic glycol and the non-aromatic glycol, if used, plus the polyfunctional alcohol having at least three hydroxyl groups. We prefer that the aromatic glycol be present in an amount of from about at least 60% to 100% by weight of the total glycol component. The glycol component supplies from about 5% to about 75% of the hydroxyl groups while the polyfunctional alcohol having at least three hydroxyl groups supplies the remainder. The reaction is carried out at temperatures of from about 220° to 260° C. for from about 2 to 12 hours.

Of course, if non-crosslinked polyesters are prepared, then the non-aromatic glycol and the polyfunctional alcohol having at least three hydroxyl groups are omitted. Likewise, the unsaturated fatty acid is omitted. In such instances, the dicarboxylic acid or anhydride and the aromatic glycol are present in approximately stoichiometric amounts.

When coating compositions such as paints, varnishes and enamels which contain our alkyd resins are formulated, other ancillary ingredients may be present such as pigments, flatting agents, metal driers and the like, all of which are well known to those skilled in the art. These compositions may be used to coat various articles or substrates such as paper, wood, cloth, glass fibers, concrete, metals, other resinous or plastic materials, etc.

For a fuller understanding of the nature and objects of our invention, reference may be made to the following examples which are given merely to illustrate the invention and are not to be construed in a limiting sense.

The first example is directed to the preparation of our aromatic glycol.

*Example I*

(A) *Preparation of the bis-phenol.*—7.97 parts by weight of trioxane were added to 91.5 parts by weight of p-tertiary octyl phenol and the resulting mixture heated to 55° C. until the phenol melted. The tertiary octyl substituent was derived from diisobutylene and has the structure

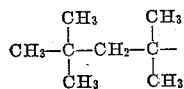

Diisobutylene is primarily a mixture of 2,4,4-trimethyl-pentene-1 and 2,4,4-trimethyl-pentene-2. 0.88 part by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass which was a pinkish-white viscous material was neutralized with 0.96 part by weight of a 50% by weight aqueous potassium carbonate solution and agitated for an additional half hour. The mass was then brought up to a temperature of 150° C. while under a nitrogen atmosphere and this temperature was maintained for 2 hours. The product, which was essentially a bis-phenol was a pinkish, tacky resin having a total alkali of 0.05%.

(B) *Preparation of the bis-phenol ethylene oxide condensate.*—96.8 parts by weight of ethylene oxide were slowly added to 424 parts by weight of the bis-phenol of part (A) in the presence of 0.4 part by weight of potassium carbonate as catalyst which was dispersed in said bis-phenol. The temperature was maintained at 170° C. during the ethylene oxide addition. The resulting condensate which was the aromatic glycol was purged with nitrogen. It was a clear amber, tacky resin at room temperature.

*Example II*

The following ingredients were loaded into a 500 cc. resin flask equipped with a heating mantle, stirrer, moisture trap, condenser and thermometer:

Distilled fatty acids of dehydrated castor oil [1]
gms__ 90.0
Aromatic glycol of Example I _____gms__ 36.0
Pentaerythritol [2] _____gms__ 26.0
Phthalic anhydride _____gms__ 48.0
Mineral spirits (a petroleum fraction having a boiling range of 310 to 394° F., Kauri-Butanol value 37.4 and an aniline cloud pt. of 134° F.)____cc__ 25.0

[1] These consist almost entirely of linoleic acid of which 30% is in the conjugated form. The acid value is 197; iodine No. is 154; sap. value is 198; color (Gardner) is 1; visc. (Stokes) at 25° C. is 0.3.
[2] This consists of a mixture of about 88% pentaerythritol and 12% related solid polyhydric alcohols, chiefly dipentaerythritol. This product has a combining wt. of 36.2 and is manufactured by Heyden Chemical Company.

Thereafter the ingredients were heated to 250° C. in one hour during which time 8 cc. of water were collected. The temperature was then maintained at 250° C. for about 1¾ hours. The resulting alkyd resin which had an oil length of about 50% was removed. By the addition of mineral spirits, a solution containing 50% by weight of resin solids was prepared. The solution had a viscosity of N (Gardner-Holdt) and an acid number of 16.7.

*Example III*

A resin having an oil length of about 40% was prepared in the same manner as Example II from the following:

Distilled fatty acids of dehydrated castor oil (same as Example II)_____gms__ 120.0
Aromatic glycol of Example I_____gms__ 90.0
Pentaerythritol (same as Example II)_____gms__ 43.5
Phthalic anhydride _____gms__ 84.0
Mineral spirits _____cc__ 25.0

A 50% by weight solution of the resin in mineral spirits was prepared. Its viscosity was Y (Gardner-Holdt) and its acid number was 16.75.

*Example IV*

A resin having an oil length of about 40% was prepared in the same manner as Example II from the following:

Distilled fatty acids of dehydrated castor oil (same as Example II)_____gms__ 108.0
2,2 di-(4-hydroxy propoxyphenyl)-propane_gms__ 66.0
Pentaerythritol (same as Example II)_____gms__ 42.0
Phthalic anhydride _____gms__ 84.0
Mineral spirits _____cc__ 25.0

A 50% by weight solution of the above resin was prepared in mineral spirits. The solution had an acid number of 17.0. It was too viscous to determine its viscosity on the Gardner-Holdt scale.

One mil air dried films were prepared by coating glass panels with the 50% resin solutions of Examples II, III and IV. However, the resin prepared according to Example IV was not sufficiently soluble in mineral spirits to form as desirable a coating composition when compared with the resins of Examples II and III, which had far superior solubility in mineral spirits. Sufficient drier was added to each solution to give 0.5% lead, 0.5% cobalt and 0.02% manganese. The one mil films were air dried for 48 hours and then subjected to water immersion for 5 days at a temperature of 25° C. The film prepared from Example IV became white and opaque and softened. It did not recover completely even after an overnight period. Films prepared from Examples II and III after the same water immersion test showed practically no blush and only slight softening. They recovered 100% i.e., the blush disappeared completely in less than one hour.

*Example V*

A medium oil alkyd was prepared in the following manner. First, a resin flask was charged with the following:

| | Percent by weight |
|---|---|
| Aromatic glycol of Example I | 19.5 |
| Soya fatty acids | 44.0 |
| Pentaerythritol (same as Example II) | 13.0 |
| Phthalic anhydride | 23.5 |

Then the charge was heated in an inert atmosphere at 220° C. with stirring during the course of 1½ hours. When this temperature was reached, it was raised again to 250° C. during the course of 2 hours and thereafter maintained at 250° C. for about 3 hours. Throughout the reaction, the water of condensation was removed azeotropically with the aid of a small amount of V.M. and P. naphtha added to the reaction mixture. The resulting alkyd resin was added to V.M. and P. naphtha in an amount to form a 50% by weight solution thereof. V.M. and P. naphtha is a petroleum fraction having a boiling range of 213 to 316° F. This solution had an acid number of 16.5, a viscosity of X–Y (Gardner-Holdt) and a color index of 12 (Gardner).

The above resin solution was used to prepare films about one mil in thickness. These were prepared by coating glass panels with the resin solution using a 3 mil Bird applicator. The coated panels were then baked for ½ hour at a temperature of 300° F. The resulting films were immersed in water at 80° F. After an immersion period of 24 hours, a slight blush was noted which disappeared within 20 minutes after removal from the water. The films were also immersed in a 3% sodium hydroxide solution for 24 hours at 80° F. in accordance with the method described in ASTM D154–53. A slight blush was observed, however, it disappeared within 20 minutes after removal of the film from the solution and the film remained intact. The film also passed the 60% elongation test when tested in a GE Impact Elongation tester. When the film was flexed or bent around a ⅛ inch mandrel, no break in the film occurred.

*Example VI*

A short oil alkyd resin was prepared in the same manner as the resin of Example V from the following:

| | Percent by weight |
|---|---|
| Aromatic glycol of Example I | 26.5 |
| Soya fatty acids | 35.5 |
| Pentaerythritol (same as Example II) | 13.0 |
| Phthalic anhydride | 25.0 |

However, in this example, after the temperature was raised to 220° C. during a period of 1½ hours, it was maintained at 220° C. for an additional 5 hours.

A 50% by weight resin solution in V.M. and P. naphtha was prepared which had the following characteristics:

| | |
|---|---|
| Acid number | 14 |
| Viscosity (Gardner-Holdt) | Z–2 |
| Color (Gardner) | 11 |

Baked films were prepared from this resin in the same manner as in Example V. They were found to have the same properties as the films of the preceding example.

The following examples represent further embodiments of our invention. Several of these examples have acid numbers less than 10. Although such alkyd resins dry slower than a comparable resin with a higher acid number, they possess improved resistance to chalking and are also compatible with reactive pigments such as zinc oxide. In these examples, the materials were charged into conventional 500 cc. resin flasks equipped with a heating mantle, agitator, thermometer, moisture trap and reflux condenser. The reaction time depended primarily upon the rate of reflux and the efficiency of water removal from the azeotropic solvent vapors. All percents are percents by weight.

| Example | VII | VIII | IX | X | XI |
|---|---|---|---|---|---|
| Aromatic glycol of Ex. 1 (percent) | 19.0 | 26.0 | 19.0 | 26.0 | 26.0 |
| Distilled fatty acids of dehydrated castor oil (percent) (Same as Ex. II) | 44.5 | 34.8 | 44.5 | 34.8 | 34.8 |
| Pentaerythritol (percent) (Same as Ex. II) | 13.7 | 14.9 | 13.7 | 14.9 | 14.9 |
| Phthalic anhydride (percent) | 22.8 | 24.3 | 22.8 | 24.3 | 24.3 |
| Xylene (cc.) | 25.0 | 25.0 | 25.0 | 25.0 | 25.0 |
| Cook procedure | (1) | (1) | (2) | (3) | (4) |
| Resin-mineral spirits solution (percent solids) | 70 | 70 | 60 | 50 | 50 |
| Visc. of solution (Gardner-Holdt) | Z₂ | Z₂ | Y–Z | U | Z₂ |
| Acid number of solution | 18.6 | 16.5 | 9.05 | 7.15 | 8.85 |
| Acid number of non-volatile material | 26.6 | 23.5 | 15.1 | 14.3 | 17.7 |

¹ Heated to 230° C. in 50 min. and held for 3 hrs. and 10 min.
² Heated to 230° C. in 50 min. and held for 3 hrs.; then heated to 240° C. in 20 min. and held for 1¼ hours.
³ Heated to 230° C. in 50 min. and held for 4¾ hours.
⁴ Heated to 230° C. in 35 min. and held at a very fast reflux for 3 hrs

*Example XII*

The following ingredients were loaded into a 500 cc. resin flask equipped with a heating mantle, stirrer, moisture trap, condenser and thermometer:

| | |
|---|---|
| Distilled fatty acids of dehydrated castor oil (same as Example II) gms | 31.0 |
| Aromatic glycol of Example I gms | 20.0 |
| Phthalic anhydride gms | 30.0 |
| Diethylene glycol gms | 5.0 |
| Pentaerythritol (same as Example II) gms | 14.0 |
| Xylene cc | 25.0 |

Thereafter, the ingredients were heated to 220° C. over a 1½ hour period and held at this temperature for 4 hours. The resulting resin was cooled and removed from the flask. By the addition of mineral spirits, a solution containing 50% by weight of resin solids was prepared. The viscosity was Z₂–Z₃ (Gardner-Holdt) and the acid number of the nonvolatile mineral was 26.5.

Having thus described our invention, what we claim as new and desire to secure by Letters Patent is:

An aromatic glycol consisting essentially of:

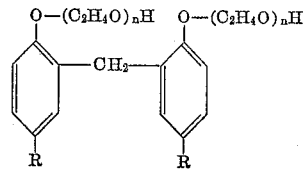

wherein R is

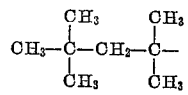

and *n* varies from 1 to 2.

References Cited in the file of this patent

UNITED STATES PATENTS

| | | |
|---|---|---|
| 1,888,849 | Dawson | Nov. 22, 1932 |
| 2,130,526 | Coleman et al. | Sept. 20, 1938 |
| 2,444,594 | Day et al. | July 6, 1948 |
| 2,499,360 | De Groote et al. | Mar. 7, 1950 |
| 2,499,363 | De Groote et al. | Mar. 7, 1950 |
| 2,571,217 | Davis et al. | Oct. 16, 1951 |
| 2,627,508 | Lum | Feb. 3, 1953 |

FOREIGN PATENTS

| | | |
|---|---|---|
| 515,907 | Great Britain | Dec. 18, 1939 |

UNITED STATES PATENT OFFICE
CERTIFICATE OF CORRECTION

Patent No. 3,064,057            November 13, 1962

Raymond Liebling et al.

It is hereby certified that error appears in the above numbered patent requiring correction and that the said Letters Patent should read as corrected below.

Column 3, line 38, for "91.5" read -- 91.15 --; column 4, line 67, for "0.5%", second occurrence, read -- 0.05% --.

Signed and sealed this 7th day of May 1963.

(SEAL)
Attest:

ERNEST W. SWIDER
Attesting Officer

DAVID L. LADD
Commissioner of Patents